United States Patent
Anderson (10) Patent No.: US 8,219,537 B1
(45) Date of Patent: Jul. 10, 2012

(54) IDENTIFYING SKEWED QUERIES IN AN MMP SYSTEM

(75) Inventor: Dirk E. Anderson, St. Augustine, FL (US)

(73) Assignee: Bank of America Corporation, Charlotte, NC (US)

( * ) Notice: Subject to any disclaimer, the term of this patent is extended or adjusted under 35 U.S.C. 154(b) by 336 days.

(21) Appl. No.: 12/511,322

(22) Filed: Jul. 29, 2009

(51) Int. Cl.
*G06F 17/30* (2006.01)
(52) U.S. Cl. ........................................ 707/705; 707/713
(58) Field of Classification Search .................. 707/705, 707/713
See application file for complete search history.

(56) References Cited

U.S. PATENT DOCUMENTS

| | | | | |
|---|---|---|---|---|
| 6,026,391 A | * | 2/2000 | Osborn et al. | 1/1 |
| 7,203,685 B2 | * | 4/2007 | Abdo et al. | 707/713 |
| 7,395,537 B1 | * | 7/2008 | Brown et al. | 718/104 |
| 7,657,501 B1 | * | 2/2010 | Brown et al. | 707/999.002 |
| 7,664,693 B1 | * | 2/2010 | von Groll et al. | 705/36 R |
| 7,693,847 B1 | * | 4/2010 | Brown et al. | 707/694 |
| 7,721,290 B2 | * | 5/2010 | Horikawa | 718/104 |
| 7,805,410 B2 | * | 9/2010 | Sasaki | 707/674 |
| 8,078,610 B2 | * | 12/2011 | Molini | 707/714 |
| 8,099,732 B2 | * | 1/2012 | Tran et al. | 718/105 |

* cited by examiner

*Primary Examiner* — Kim Nguyen
(74) *Attorney, Agent, or Firm* — Weiss & Arons LLP; Michael Springs (57) ABSTRACT

Apparatus and methods for determination of unacceptable skew for query in a massively parallel processing system. The apparatus and methods may use data associated with processing the query that has been stored in computer logs. The processing data may be used to determine the actual level of skew for the query. The apparatus and methods may calculate an acceptable level of skew. If the actual skew exceeds the acceptable skew, the query may be considered unacceptably skewed and may be flagged for tuning.

26 Claims, 6 Drawing Sheets

```
        ⎧ SELECT  RANK(ImpactCPU) AS CPURank
        ⎪          ,UserName
        ⎪          ,a.ProcId
        ⎪          ,a.QueryId
        ⎪          ,StartTime
        ⎪          ,QryRespTime
   601 ⎨          ,SumCPU
        ⎪          ,SumIO
        ⎪          ,CpuSkw
        ⎪          ,CPUBEP
        ⎪          ,IOSkw
        ⎪          ,IOBEP
        ⎩          ,ImpactCPU
        ⎧          ,CASE
        ⎪              WHEN QueryText IS NULL OR QueryText = ''
   602 ⎨              THEN SUBSTRING(SQLTextInfo FROM 0 FOR 15000)
        ⎪              ELSE a.querytext
        ⎩          END  AS QryText
        ⎧          ,CASE
        ⎪              WHEN QryText LIKE 'COLLECT%'                          THEN 'YES'
        ⎪              WHEN SumCPU <= 10.0 AND ImpactCPU < 500.00 THEN 'YES'
   603 ⎨              WHEN CPUSkw > CPUBEP                                    THEN 'NO '
        ⎪              ELSE 'YES'
        ⎩          END  AS CPUSkewCompliant
        ⎧          ,CASE
        ⎪              WHEN QryText LIKE 'COLLECT%' THEN 'YES'
        ⎪              WHEN SumIO < 1000             THEN 'YES'
   604 ⎨              WHEN IOSkw > IOBEP            THEN 'NO '
        ⎪              ELSE  'YES'
        ⎩          END  AS  IOSkewCompliant
        ⎧ FROM  (
        ⎪    SELECT a.UserName
        ⎪         , a.ProcId
   605 ⎨         , a.QueryId
        ⎪         ,((firstresptime-starttime) DAY(4) TO SECOND) AS QryRespTime
        ⎪         , a.TotalCPUTime AS SumCPU
        ⎩         , a.TotalIOCount  AS SumIO
```

FIG. 6A

```
606  ,CASE
        WHEN (TotalCPUTime / (HASHAMP()+1) ) =0 THEN 0
        ELSE HotAmp1CPU/(TotalCPUTime / NumofActiveAmps )
     END (Dec(6,2)) AS CpuSkw
607  ,CASE
        WHEN (TotalIOCount / (HASHAMP()+1) ) =0 THEN 0
        ELSE HotAmp1IO/(TotalIOCount / NumofActiveAmps )
     END (Dec(6,2)) AS IOSkw
608  ,a.HotAMP1CPU * NumofActiveAmps  /*no. of Amps*/ AS ImpactCPU
     , a.starttime
     , a.querytext
     , a.logdate
609  ,CASE WHEN TotalCPUTime>0.01
              THEN ( (((SIN(LOG(TotalCPUTime))*(TotalCPUTime))*2.5)
                                                    /* mid-range */
                  + (SQRT(TotalCPUTime)*15) + (TotalCPUTime*10.5)
                                                    /* high range */
                  + ((1/TotalCPUTime)*660)          /*low-range*/
                  )
                  / (.75 +(TotalCPUTime *
        (LOG(TotalCPUTime)*(LOG(TotalCPUTime)*.50))) )
              ELSE 10000
         END           AS CPUBEPRaw
     ,CASE WHEN CPUBEPRaw < 1.25
              THEN 1.25 ELSE CPUBEPRaw END AS CPUBEP
610  ,CASE WHEN TotalIOCount>1
              THEN
     (((1/(TotalIOCount/56)*((HASHAMP()+1)*10))+(TotalIOCount+COSH(LOG(((H
     ASHAMP()+1)*15)*TotalIOCount))) / SQRT(EXP(LOG(TotalIOCount))) * 55))
                          /( (Totallocount + ((HASHAMP()+1)/20) ))
              ELSE 10000
         END AS IOBEPRaw
     ,CASE WHEN IOBEPRaw  < 1.25
              THEN 1.25 ELSE IOBEPRaw  END AS IOBEP
611  FROM PMCPINFO. DBQLogTbl_dbc a
     WHERE logdate IN (1090603)
         AND username = 'nbkjpx2'
         AND ImpactCPU > 0.00
     GROUP BY 1,2,3,4,5,6,7,8,9,10,11,12,13,14,15  ) AS a
     LEFT OUTER JOIN PMCPINFO.DBQLSQLTbl_dbc s
         ON  s.ProcID    = a.ProcID
         AND s.QueryID  = a.QueryID
         AND s.logdate = a.logdate
         AND sqlrowno = 1
     WHERE QryText NOT LIKE ALL ('SHOW%','DATABASE%','BT%',' HELP%')
     ORDER BY StartTime
     ;
```

FIG. 6B

IDENTIFYING SKEWED QUERIES IN AN MMP SYSTEM

FIELD OF TECHNOLOGY

Aspects of the disclosure relate to massively parallel database processing. In particular, the disclosure relates to identifying unacceptably skewed queries that may require tuning.

BACKGROUND

A massively parallel processing system ("MPP system") is a computer system with many independent arithmetic units or entire microprocessors running in parallel. The system may incorporate hundreds or thousands of central processing units ("CPUs") working together.

A query processed on the system may be broken up and distributed over more than one CPU for processing. In almost all cases, the processing times for the individual CPUs working on the query will not be exactly equal. Skew occurs when one processor is performing more work than the others.

The higher the variation between processors performing the least and most amounts of work, the greater the degree of skewing. Too much skew can significantly impair the efficiency of the system. When one CPU is working on a query for a disproportionate amount of time, other queries waiting to be processed will be backed up.

Conventionally, acceptable skew is determined by hand based on analyst experience.

For a given query, the associated information regarding processing history, such as total CPU time expended, and average CPU time per processor are stored in computer logs. Conventionally, this information is analyzed by hand to determine if the amount of skew for the query is acceptable, and if not, whether the query is a candidate for tuning. This approach is time consuming and requires analysts experienced in assessing the query data.

It would be desirable, therefore, to provide apparatus and methods for electronically identifying unacceptably skewed queries processed in an MPP system.

SUMMARY OF THE INVENTION

It is an object of this invention to provide apparatus and methods for electronically identifying unacceptably skewed queries processed in an MPP system. Apparatus and methods for making such an electronic identification are provided.

Processing data associated with a query may be stored in computer logs. The apparatus and methods may extract processing data for a query from the logs.

The apparatus and methods may filter the information obtained from the logs to eliminate categories of queries that are unsuitable for tuning.

For a query which may be a candidate for tuning, the apparatus and methods may determine a value for the actual amount of skew. The apparatus and methods may calculate a value for an acceptable amount of skew. If the actual amount of skew exceeds the acceptable amount, the query may be considered unacceptably skewed and may be flagged for tuning.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIGS. 6A and 6B shows illustrative source code corresponding to a portion of the process shown in FIG. 3.

DETAILED DESCRIPTION OF THE INVENTION

Apparatus and methods for electronically identifying unacceptably skewed queries processed in an MPP system are provided.

Skewing is an unavoidable result in massively parallel processing. However, too much skewing can waste significant processing time and impair the efficiency of a processing system. A query which is unacceptably skewed may be tuned to enable the elements of the query to be more efficiently distributed among the parallel processing units.

The determination of whether a query requires tuning is based on processing data stored in computer logs. Conventionally, experienced analysts review the processing data stored in the logs by hand. In many cases these personnel could be more profitably employed on other products. In addition, the time spent waiting on analysis may delay the deployment of new queries.

Under the principles of the invention, a determination of unacceptable skewing may be made electronically. Developers testing a query may obtain results immediately, without waiting for analyst review. Testing for skewing, tuning and retesting may become an organic part of the development process.

The apparatus and methods may begin by extracting query processing data from the computer logs for analysis. Examples of processing data include the total CPU time used, the CPU time for each processor, the total number of blocks read or written by the disk subsystem ("I/O operations"), the number of I/O operations per processor and any other suitable data.

The apparatus and methods may filter groups of queries which are not suitable for tuning. Examples of queries not suitable for tuning include help queries, drop queries and any other appropriate query.

Equations 1-4, below, illustrate a method in accordance with the principles of the invention. The apparatus and methods may determine the amount of skew and whether that degree of skew is acceptable. An unacceptably skewed query may be flagged for further tuning. In the method illustrated below, skewing is measured in terms of CPU processing time and number of I/O operations, but any suitable measure of skew may be applied.

The apparatus and methods may determine the amount of actual skew for the query.

Actual skew based on CPU processing time may be calculated as shown in Equation 1 or using any other suitable measure of CPU skew. In Equation 1, CPU skew is measured as the processing time on the busiest processor divided by the average processing time.

$$SKEW_{CPU} = \frac{T_B}{\sum_{n=1}^{N} T_N / N} \qquad \text{Eqn. 1}$$

In Equation 1, $T_n$ is the processing time in seconds for CPU n working on the query. The term $T_B$ is the processing time on the busiest processor. Processing times for each individual processor may be extracted from the log and ranked for analysis. N is the number of active processors.

Actual skew based on the number of I/O operations may be calculated as shown in Equation 2 or using any other suitable measure of I/O skew. In Equation 2, I/O skew is calculated as the number of I/O operations on the busiest processor divided by the average number of I/O operations.

$$SKEW_{IO} = \frac{O_B}{\sum_{n=1}^{N} O_N / N} \qquad \text{Eqn. 2}$$

In Equation 2, the term $O_n$ corresponds to the total number of I/O operations for a processor and term N corresponds to the number of processors working on the query. The term $O_B$ is the number of I/O operations on the busiest processor.

The apparatus and methods may determine an acceptable level of skew for the query. Acceptable skew defines the upper limit of skew that may be tolerated. Any skewing above this level may result in the query being recommended for tuning.

Equation 3 may be used to calculate an acceptable level of CPU skew and may be calculated based on the measured CPU processing time for the query.

Equation 3 is based on an empirically derived data set of acceptable skew levels that correspond to observed CPU processing times. This data set was used to develop a mathematical correlation between acceptable skew and CPU processing time. The correlation may define a curve passing through, or constrained by, the set of known data points.

The curve defined by the correlation may be adjusted to follow the shape of a curve derived by graphing average CPU skew as a function of processing time. The constants in Equation 3 apply to different sections of the curve and may be modified to adjust the shape of curve. The correlation shown in Equation 3 was developed using mathematical operations which are compatible with database programming, but other operations may be applied.

$$ACCTSKEW_{CPU} = \frac{MR \times T \times \sin(\log(T)) + 15\sqrt{T} + UR \times T + \frac{LR}{T}}{.75 + .5 \times T \times \log^2(T)}. \qquad \text{Eqn. 3}$$

In Eqn. 3, $ACCTSKEW_{CPU}$ is acceptable CPU skew. Acceptable CPU skew is calculated as a function of T, the total CPU seconds needed to process the query. The default value for the constant MR is 2.5, but may be modified to alter the mid-range of the curve. The default value for the constant UR is 10.5, but may be modified to alter the upper range of the curve. The default value for the constant LR is 660, but may be modified to alter the lower range of the curve.

Equation 4 may be used to calculate an acceptable level of I/O skew based on the measured number of I/O operations for a query.

Equation 4 is based on an empirically derived data set of acceptable skew levels that correspond to observed numbers of I/O operations. This data set was used to develop a mathematical correlation between acceptable skew and number of I/O operations. The correlation may define a curve passing through, or constrained by, the set of known data points.

The correlation may be adjusted to follow the shape of a curve showing average I/O skew based on historical query data. The constants in Equation 4 apply to different sections of the curve and may be changed to adjust the curve if necessary. The correlation shown in Equation 4 was developed using mathematical operations which are compatible with database programming, but other operations may be applied.

$$ACCTSKEW_{IO} = \frac{\frac{56}{O} \times N \times LR + \frac{O + \cosh(\log(N \times UR \times O))}{55\sqrt{\exp(\log(O))}}}{O + \frac{N}{20}} \qquad \text{Eqn. 4}$$

In Equation 4, $ACCTSKEW_{IO}$ is the acceptable IO skew. Equation 4 calculates $ACCTSKEW_{IO}$ as a function of O the total number of I/O operations for the query, and N, the number of processing units working on the query.

The apparatus and methods may compare the actual CPU skew for a query as calculated in Equation 1 with the acceptable CPU skew for the query calculated in Equation 3. Where actual CPU skew exceeds acceptable CPU skew, the query may be considered unacceptably skewed based on CPU processing time.

The apparatus and methods may compare the actual I/O skew as calculated in Equation 2 with the acceptable I/O skew for the query calculated in Equation 4. Where actual I/O skew exceeds acceptable I/O skew, the query may be considered unacceptably skewed based on I/O operations.

The apparatus and methods may mark an unacceptably skewed query for tuning using any appropriate method. Embodiments of the invention will now be described with reference to FIGS. 1-6.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
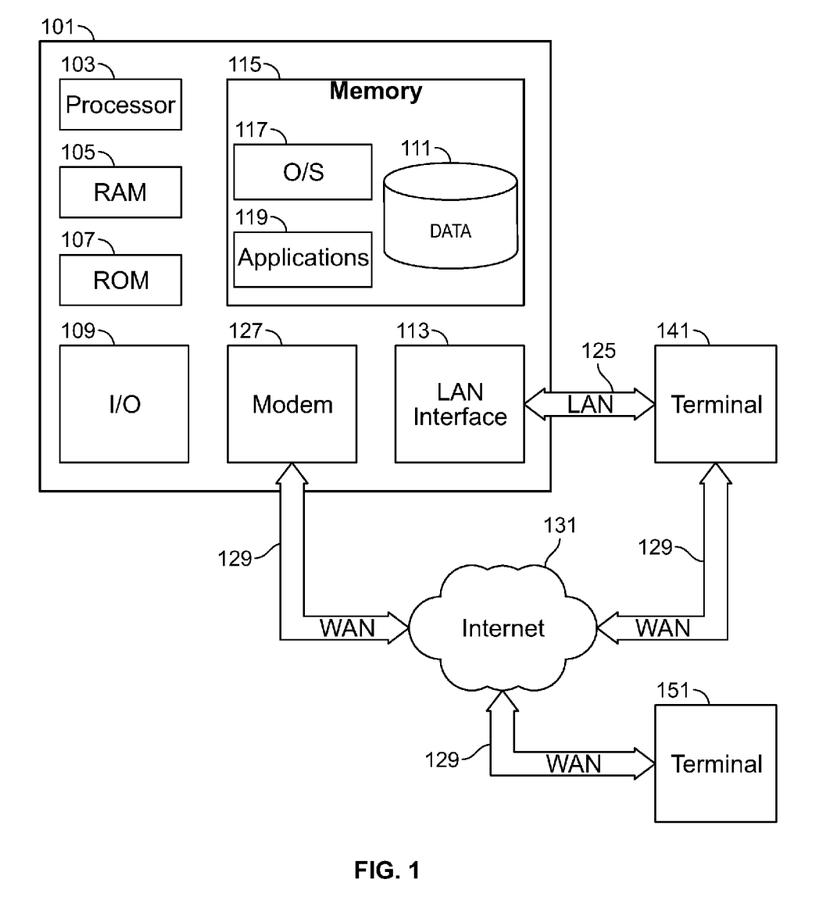
FIG. 1 shows a schematic diagram of apparatus that may be used in connection with the principles of the invention.

FIG. 1 is a block diagram that illustrates a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 125.

Input/output ("I/O") module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 125 and/or storage to provide instructions to processor 103 for enabling server 101 to perform various functions. For example, memory 125 may store software used by server 101, such as an operating system 117, application programs 119, and an associated database 121. Alternatively, some or all of server 101 computer executable instructions may be embodied in hardware or firmware (not shown). As described in detail below, database 121 may provide storage for query processing data, skew values, tuning recommendations and any other suitable information.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 123. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

Terminal 151 and/or terminal 141 may be portable devices such as a laptop, cell phone, blackberry, or any other suitable device for storing, transmitting and/or transporting relevant information.

Query processing information, skew values, tuning recommendations, and any other suitable information may be stored in memory 125.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
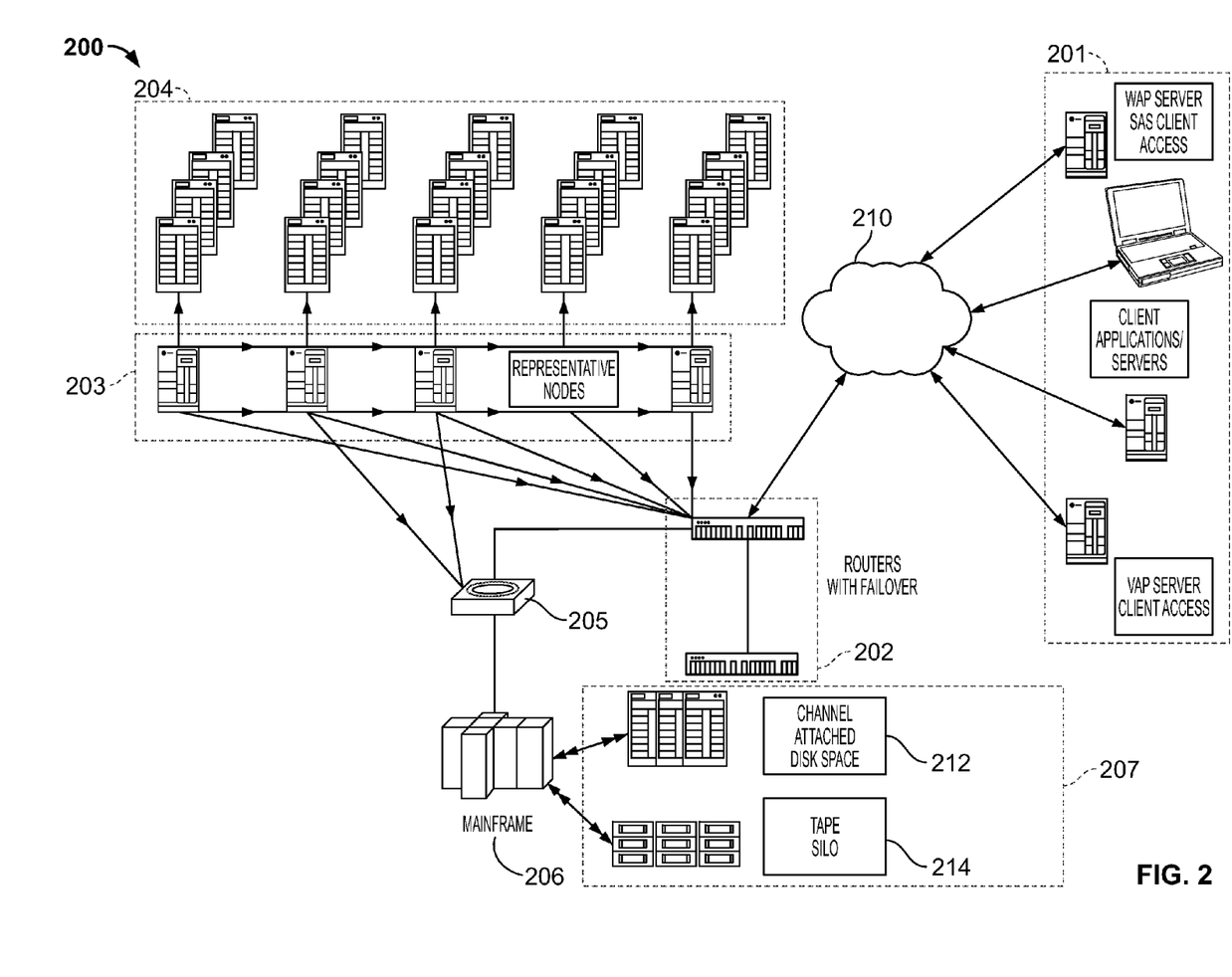
FIG. 2 is a schematic diagram of other apparatus that may be used in connection with the principles of the invention.

FIG. 2 shows illustrative system 200. System 200 is an illustrative massively parallel processing database architecture. System 200 may include three primary components: client applications and servers 201, parallel processing units 204, and permanent data storage 207.

A client may access the system (e.g., to submit a database query for processing) using client applications and servers 201. Client data may be routed, e.g., via communications network 210, for processing through routers 202. Routers 202 may be configured with failover systems. The data may be routed through nodes 203 that may be channel attached (e.g., via TC/IP and channel connections) to the array of processors 204. In a MPP system, each processor functions as a subsystem with its own memory and operating system. The processors communicate via a high speed interconnect.

Data may be routed from the processors back to the client servers for client access. Alternatively, data may be transferred through data connection device 205 to mainframe 206 and to channel attached storage devices 207. Store devices 207 may include, for example, channel attached disk space 212, tape silo 214, and/or any other suitable storage devices. The many interconnections supplied by the extensive networking on this system may enable widespread access and unobstructed data flow between the three different areas of the system.

Figure 3:
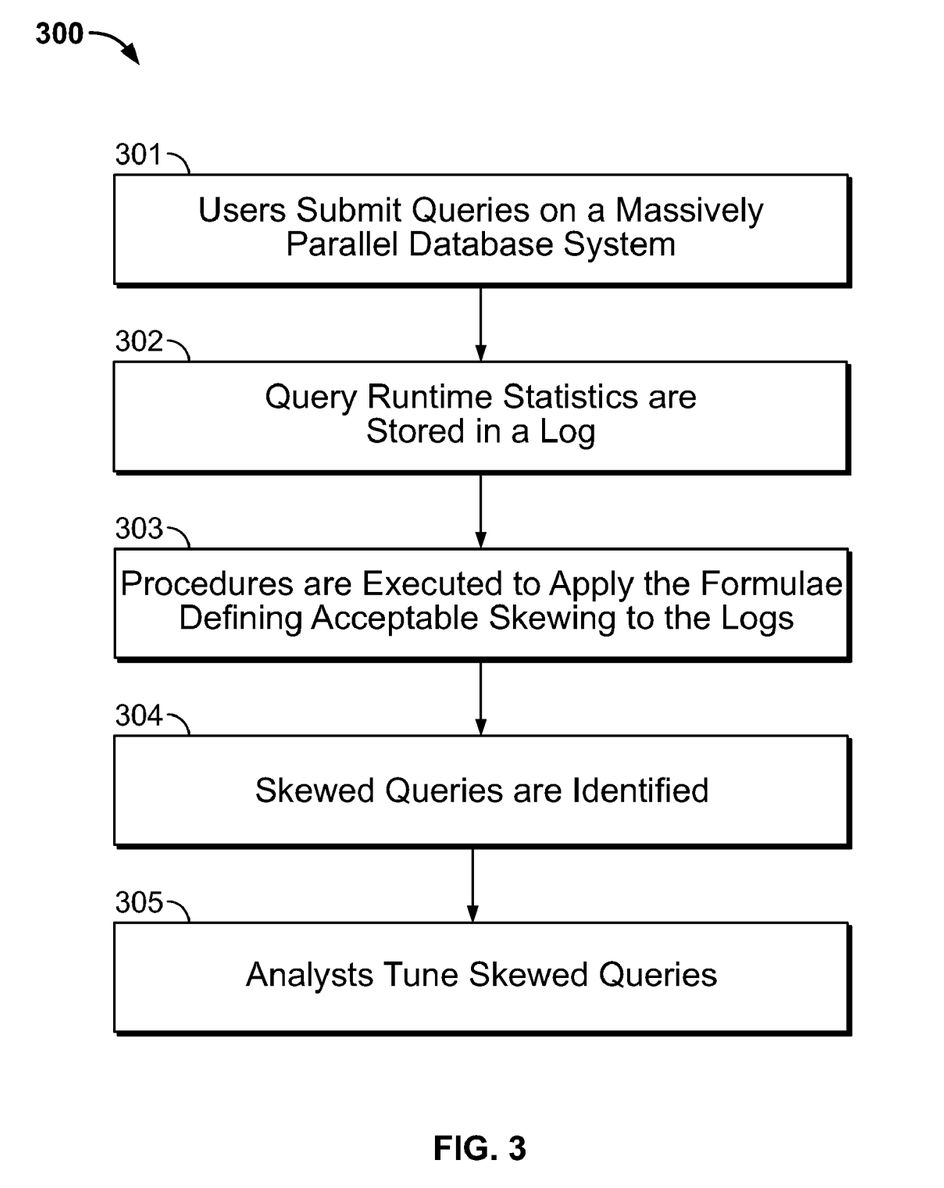
FIG. 3 is a flow diagram that shows a process in accordance with the principles of the invention.

FIG. 3 is a high level flow diagram showing illustrative process 300 for identifying a skewed query for tuning.

At step 301, users submit queries on a massively parallel database system. At step 302, query runtime statistics are stored in a computer log. At step 303, procedures are executed to apply the formulae governing acceptable skewing to the logs. At step 304, skewed queries are identified. At step 305, analysts tune unacceptably skewed queries.

Figure 4:
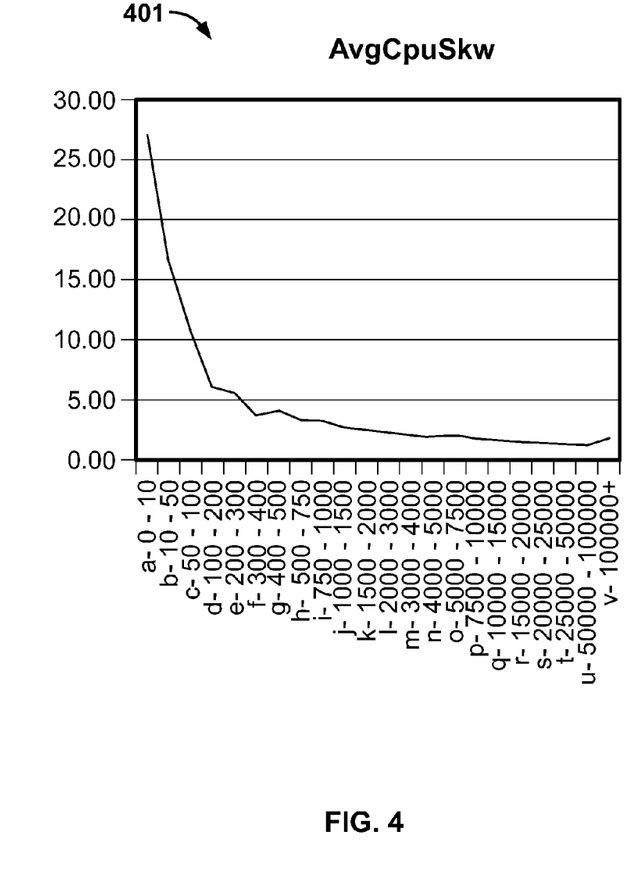
FIGS. 4 and 5 show illustrative data corresponding to a portion of the process shown in FIG. 3.
Figure 5:
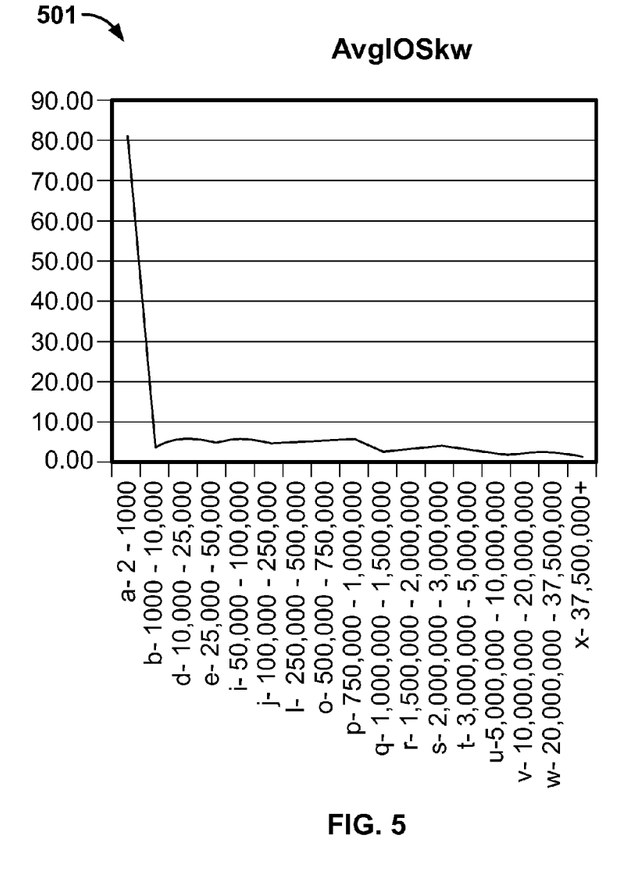

FIGS. 4 and 5 show illustrative data used in creating the formulae shown in Equations 3 and 4. Graph 401 shows average historical CPU skew (vertical axis) for a given CPU processing time (horizontal axis). The data is drawn from CPU times collected across 5 million queries. Equation 3 is created using known acceptable skew data points and the correlation is adjusted to model the actual historical curve shown at graph 401.

Graph 501 shows the average historical I/O skew (vertical axis) for a given number of I/O operations (horizontal axis). The data is drawn from I/O operations over 15 million queries. This curve is used to define the shape of the showing acceptable I/O skew. The mathematical correlation used for calculating acceptable I/O skew may be adjusted based on the shape of the historical curve shown.

Figure 6A:
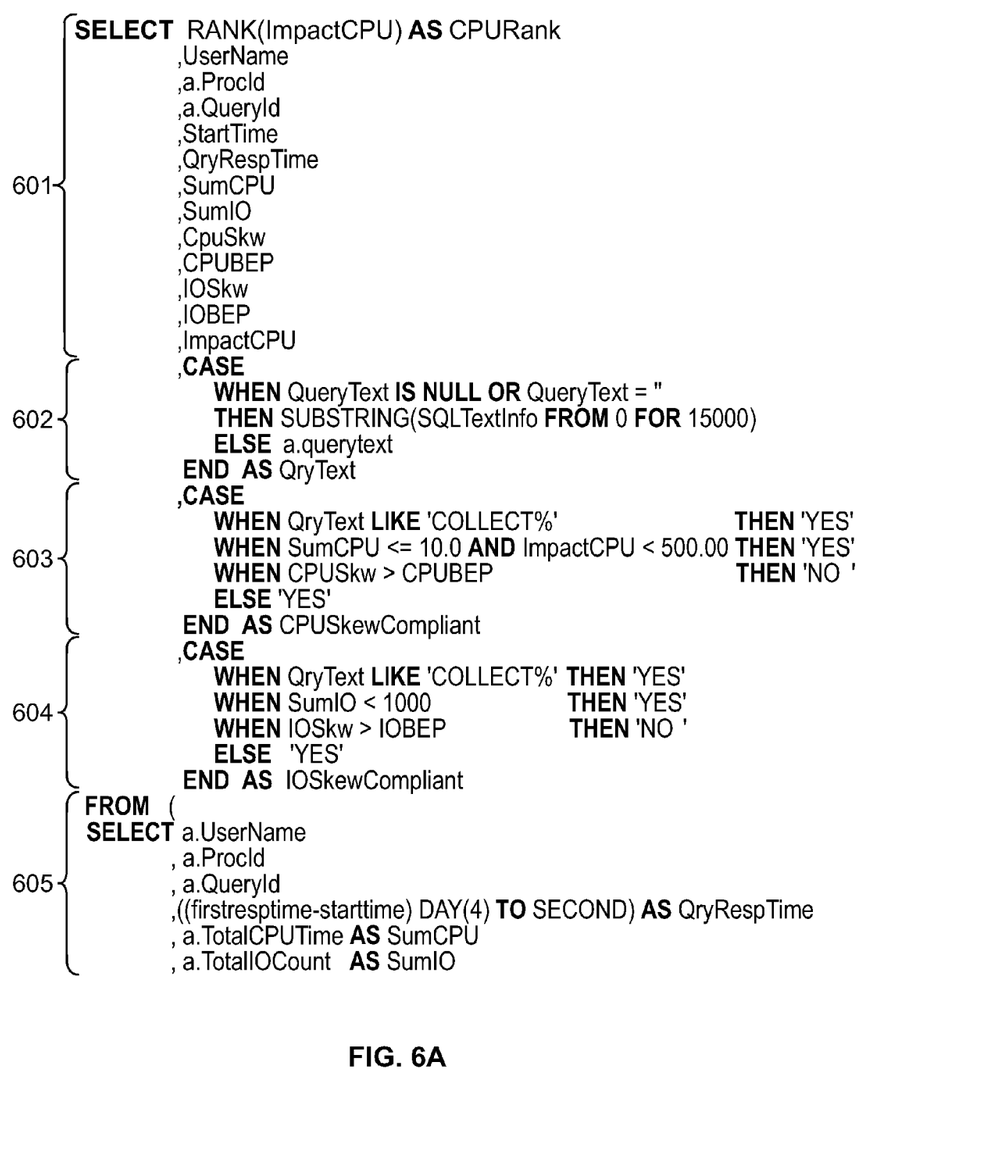

FIGS. 6A and 6B shows illustrative computer programming code for identifying unacceptably skewed queries. The illustrative code is programmed using a relational database management system sold under the trademark TERADATA, by the Teradata Corporation, Miamisburg, Ohio, but any suitable system may be used.

Section 601 of the code identifies variables that may be used in the illustrative query. Some of these variables are drawn from the computer logs and some may be calculated as part of the query instructions. Section 602 sets up the parameters of the query text variable, eliminating text that is null or blank.

Section 603 sets up the parameters for CPU skew compliance. A specific category of query is eliminated from consideration, as well as queries which require very little processing. The upper limit of acceptable CPU skew is labeled CPU break-even point ("CPUBEP"). Where actual CPU skew ("CPUskew") exceeds acceptable CPU skew the query is flagged as non-compliant.

Section 604 sets up the parameters for I/O skew compliance. Again, a specific category of query is eliminated from consideration as are queries which require little processing. The upper limit of acceptable I/O skew is labeled I/O break-even point ("IOBEP"). Where actual I/O skew ("IOskew") exceeds acceptable I/O skew the query is flagged as noncompliant.

Section 605 identifies another set of variables for consideration.

At section 606, CPU skew is calculated as shown in Equation 1, above. In this illustration skew is calculated to two decimal places. At section 607, I/O skew is calculated as shown in Equation 2, above. I/O skew is also calculated to two decimal places.

Section 608 identifies another set of variables for consideration. At section 609, acceptable CPU skew is calculated as a function of processing time as shown in Equation 3, above. Any results below 1.25 are set at 1.25 which is the threshold for acceptable skew levels. At section 610, acceptable I/O skew is calculated as shown in Equation 4, above. Again, any results below 1.25 are set at 1.25.

At section 611, various query data is retrieved from the computer logs. Specific categories of queries are filtered out and are not considered candidates for tuning, regardless of the amount of skew in their processing. Thus, apparatus and methods for identifying skewed queries processed in an MPP system are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for electronically identifying an unacceptably skewed query, the method comprising:
 electronically extracting query data from a computer log;
 using the query data, determining, using a processor, whether the query is unacceptably skewed; and
 marking an unacceptably skewed query as a candidate for tuning; wherein:
 the determining whether a query is unacceptably skewed comprises:
  calculating an actual skew for the query;
  calculating a maximum acceptable skew for the query;
  comparing the actual skew to the maximum acceptable skew; and
  identifying a query as unacceptably skewed if the actual skew exceeds the maximum acceptable skew;
 the calculating a maximum acceptable skew comprises calculating a maximum acceptable CPU skew based on the CPU processing time for the query;
 the calculating a maximum acceptable CPU skew comprises using the formula $$ACCTSKEW_{CPU} = \frac{\frac{56}{O} \times N \times LR + \frac{O + \cosh(\log(N \times UR \times O))}{55\sqrt{\exp(\log(O))}}}{O + \frac{N}{20}};$$

$ACCTSKEW_{CPU}$ corresponds to the maximum acceptable CPU skew;
 T corresponds to the total CPU processing time for all processors for the query, ranges from 0 to a maximum value, and has three sub-ranges: a mid-range, an upper range, and a lower range;
 MR is a constant that scales the acceptable skew corresponding to the mid-range;
 UR is a constant that scales the acceptable skew corresponding to the upper range; and
 LR is a constant that scales the acceptable skew corresponding to the lower range.

2. The method of claim 1 wherein the extracting query data from a computer log comprises extracting the text of the query.

3. The method of claim 1 wherein the extracting query data from a computer log comprises extracting a measure of CPU time expended for each active processor.

4. The method of claim 1 wherein the extracting query data from a computer log comprises extracting a measure of number of blocks read or written for each disk subsystem processing the query.

5. The method of claim 4 wherein blocks read or written are defined as I/O operations.

6. The method of claim 1 wherein the calculating an actual skew comprises calculating actual CPU skew based on the processing time for the query.

7. The method of claim 6 wherein, when the query is processed by a plurality of CPUs, one or more of the CPUs processing for more time than the other CPUs and thus having a maximum CPU processing time, and the plurality of CPUs having an average CPU processing time for the query, the calculating an actual CPU skew comprises dividing the maximum CPU processing time by the average CPU processing time.

8. The method of claim 1 wherein the formula is derived by:
 selecting at least two data points for acceptable CPU skew as a function of processing time;
 formulating a mathematical relationship based on the data points; and
 scaling the mathematical relationship relative to the average CPU skew for a given processing time value.

9. The method of claim 1 wherein the calculating an actual skew comprises calculating actual I/O skew based on the number of I/O operations for the query.

10. The method of claim 9 wherein, when the query is processed by a plurality of processing units, one or more of the processing units carrying out more I/O operations than the other processing units and thus having a maximum number of I/O operations, and the plurality of processing units having an average number of I/O operations for the query, the calculating an actual I/O skew comprises dividing the maximum number of I/O operations by the average number of I/O operations.

11. A method for electronically identifying an unacceptably skewed query, the method comprising:
electronically extracting query data from a computer log;
using the query data, determining, using a processor, whether the query is unacceptably skewed; and
marking an unacceptably skewed query as a candidate for tuning; wherein:
the determining whether a query is unacceptably skewed comprises:
calculating an actual skew for the query;
calculating a maximum acceptable skew for the query;
comparing the actual skew to the maximum acceptable skew; and
identifying a query as unacceptably skewed if the actual skew exceeds the maximum acceptable skew;
the calculating a maximum acceptable skew comprises calculating a maximum acceptable I/O skew based on the number of I/O operations for the query;
the calculating a maximum acceptable I/O skew comprises using the formula $$ACCTSKEW_{IO} = \frac{\frac{56}{O} \times N \times LR + \frac{O + \cosh(\log(N \times UR \times O))}{55\sqrt{\exp(\log(O))}}}{O + \frac{N}{20}};$$

$ACCTSKEW_{IO}$ corresponds to the maximum acceptable I/O SKEW;
O corresponds to the total number of I/O operations for the query, ranges from 0 to a maximum value, and has two sub-ranges: an upper range and a lower range;
N corresponds to the number of processing units working on the query;
LR is a constant that scales the lower range; and
UR is a constant that scales the upper range.

12. The method of claim 11 wherein the extracting query data from a computer log comprises extracting the text of the query.

13. The method of claim 11 wherein the extracting query data from a computer log comprises extracting a measure of CPU time expended for each active processor.

14. The method of claim 11 wherein the extracting query data from a computer log comprises extracting a measure of number of blocks read or written for each disk subsystem processing the query.

15. The method of claim 14 wherein blocks read or written are defined as I/O operations.

16. The method of claim 11 wherein the calculating an actual skew comprises calculating actual CPU skew based on the processing time for the query.

17. The method of claim 16 wherein, when the query is processed by a plurality of CPUs, one or more of the CPUs processing for more time than the other CPUs and thus having a maximum CPU processing time, and the plurality of CPUs having an average CPU processing time for the query, the calculating an actual CPU skew comprises dividing the maximum CPU processing time by the average CPU processing time.

18. The method of claim 11 wherein the calculating a maximum acceptable skew comprises calculating a maximum acceptable CPU skew based on the CPU processing time for the query.

19. One or more non-transitory computer-readable media storing computer-executable instructions which, when executed by a processor on a computer system, perform a method identifying an unacceptably skewed query, said method comprising:
electronically extracting query data from a computer log;
using a processor module, analyzing the query data to determine whether the query is unacceptably skewed;
marking an unacceptably skewed query for tuning;
calculating an actual skew for the query;
calculating a maximum acceptable skew for the query;
comparing the actual skew to the maximum acceptable skew; and
identifying a query as unacceptably skewed if the actual skew exceeds the acceptable skew;
wherein:
the calculating a maximum acceptable skew comprises calculating a maximum acceptable CPU skew based on processing time for the query;
the calculating a maximum acceptable CPU skew comprises using a processor module to calculate maximum acceptable CPU skew based on the formula $$ACCTSKEW_{CPU} = \frac{MR \times T \times \sin(\log(T)) + 15\sqrt{T} + UR \times T + \frac{LR}{T}}{.75 + .5 \times T \times \log^2(T)};$$

ACCTSKEWCPU corresponds to the maximum acceptable CPU skew;
T corresponds to the total CPU processing time for all processors for the query, ranges from 0 to a maximum value, and has three sub-ranges: a mid-range, an upper range and a lower range;
MR is a constant that scales the acceptable skew corresponding to the mid-range;
UR is a constant that scales the acceptable skew corresponding to the upper range; and
LR is a constant that scales the acceptable skew corresponding to the lower range.

20. The media of claim 19 wherein, in the method, the calculating an actual skew comprises calculating actual CPU skew based on the CPU processing time for the query.

21. The media of claim 19 wherein, in the method, the calculating an actual skew comprises calculating an actual I/O skew based on the number of read/write operations carried out in processing the query.

22. The media of claim 19 wherein, in the method, the calculating a maximum acceptable skew comprises calculating a maximum acceptable I/O skew based on the number of read/write operations carried out in processing the query.

23. One or more non-transitory computer-readable media storing computer-executable instructions which, when executed by a processor on a computer system, perform a method identifying an unacceptably skewed query, said method comprising:
electronically extracting query data from a computer log;
using a processor module, analyzing the query data to determine whether the query is unacceptably skewed;
marking an unacceptably skewed query for tuning;
calculating an actual skew for the query;
calculating a maximum acceptable skew for the query;
comparing the actual skew to the maximum acceptable skew; and
identifying a query as unacceptably skewed if the actual skew exceeds the acceptable skew;
wherein:

the calculating a maximum acceptable skew comprises calculating a maximum acceptable I/O skew based on the number of read/write operations carried out in processing the query;

the calculating a maximum acceptable level of skew comprises using a processor module to calculate maximum acceptable I/O skew using the formula $$ACCTSKEW_{IO} = \frac{\frac{56}{O} \times N \times LR + \frac{O + \cosh(\log(N \times UR \times O))}{55\sqrt{\exp(\log(O))}}}{O + \frac{N}{20}};$$

$ACCTSKEW_{IO}$ corresponds to the maximum acceptable I/O skew;

O corresponds to the total number of read/write operations for the query, ranges from 0 to a maximum value, and has two sub-ranges: a lower range and an upper range;

N corresponds to the number of processing units working on the query;

LR is a constant that scales the lower range; and

UR is a constant that scales the upper range.

24. The media of claim 23 wherein, in the method, the calculating an actual skew comprises calculating actual CPU skew based on the CPU processing time for the query.

25. The media of claim 23 wherein, in the method, the calculating a maximum acceptable skew comprises calculating a maximum acceptable CPU skew based on processing time for the query.

26. The media of claim 23 wherein, in the method, the calculating an actual skew comprises calculating an actual I/O skew based on the number of read/write operations carried out in processing the query.

\* \* \* \* \*